United States Patent [19]

Sabol

[11] 4,168,752

[45] Sep. 25, 1979

[54] FLEXIBLE CONDUIT FOR EFFECTING LATERAL CHANNELLING IN COAL OR OIL SHALE BEDS

[76] Inventor: Karol Sabol, 3116 - 67 St., Edmonton, Alberta, Canada

[21] Appl. No.: 854,084

[22] Filed: Nov. 23, 1977

[30] Foreign Application Priority Data

Dec. 20, 1976 [GB] United Kingdom ............... 52999/76

[51] Int. Cl.$^2$ ...................... E21C 37/16; E21C 43/00; F16L 11/14
[52] U.S. Cl. ........................................ 175/12; 175/61; 175/67; 175/77; 166/50; 138/120; 285/114
[58] Field of Search ........................ 175/12, 14, 61, 67, 175/77, 320; 166/50, 251, 256–260; 299/5, 17; 64/2 R; 138/115, 120, 137, 138, 148, 150; 285/114, 115, 233, 235

[56] References Cited

U.S. PATENT DOCUMENTS

| | | | |
|---|---|---|---|
| 2,141,880 | 12/1938 | Satre | 175/320 |
| 2,156,587 | 5/1939 | Hatteberg | 138/120 X |
| 2,198,016 | 4/1940 | Rogers et al. | 175/320 X |
| 2,258,001 | 10/1941 | Chamberlain | 175/67 X |
| 2,271,005 | 1/1942 | Grebe | 166/50 X |
| 2,758,612 | 8/1956 | Zaleski | 285/114 |
| 2,788,956 | 4/1957 | Pevere et al. | 175/12 X |
| 2,822,158 | 2/1958 | Brinton | 299/5 X |
| 3,301,940 | 1/1967 | Rischard et al. | 138/120 X |
| 3,563,606 | 2/1971 | Sears | 175/12 X |
| 3,908,703 | 9/1975 | Bournazel et al. | 138/137 X |

Primary Examiner—Ernest R. Purser
Assistant Examiner—Nick A. Nichols, Jr.
Attorney, Agent, or Firm—Shlesinger, Arkwright, Garvey & Dinsmore

[57] ABSTRACT

There is provided in accordance with the invention apparatus and a method for boring holes through carbonaceous deposits.

The method involves the step of introducing combustion-supporting gases such as air under pressure through the apparatus installed in a well hole opposite the area to be bored. The apparatus comprises inner and outer flexible tubes with flexible, jointed armour and a directional nozzle which permits it to be bent and change attitude as necessary. The adjacent carbonaceous interface after being ignited is maintained in this condition by the combustion-supporting gas which is supplied under pressure. As the combustion proceeds, the pressure expels the combustion products and the gas injector is advanced along the channel it has previously formed.

6 Claims, 8 Drawing Figures

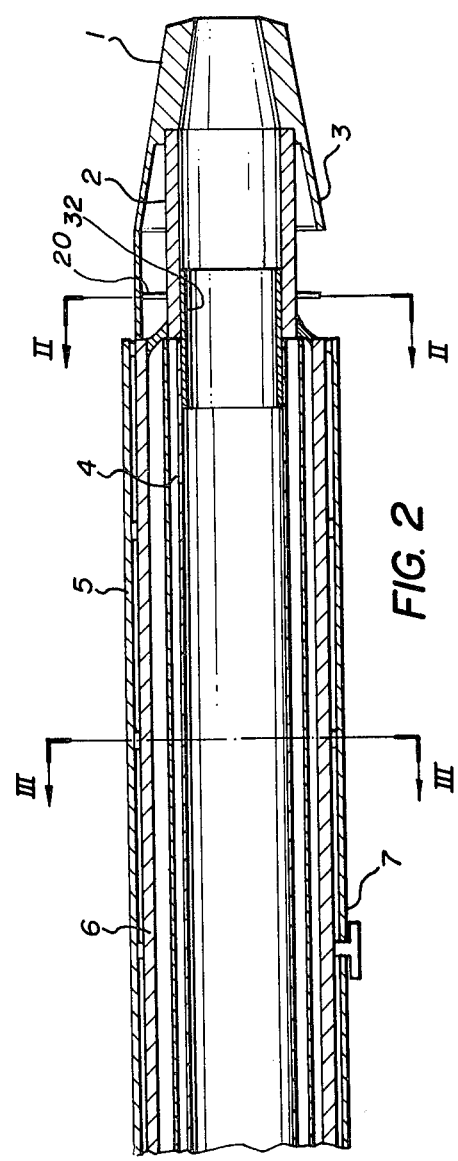
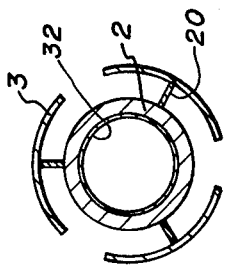
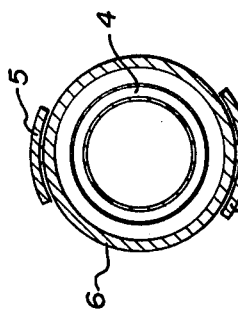

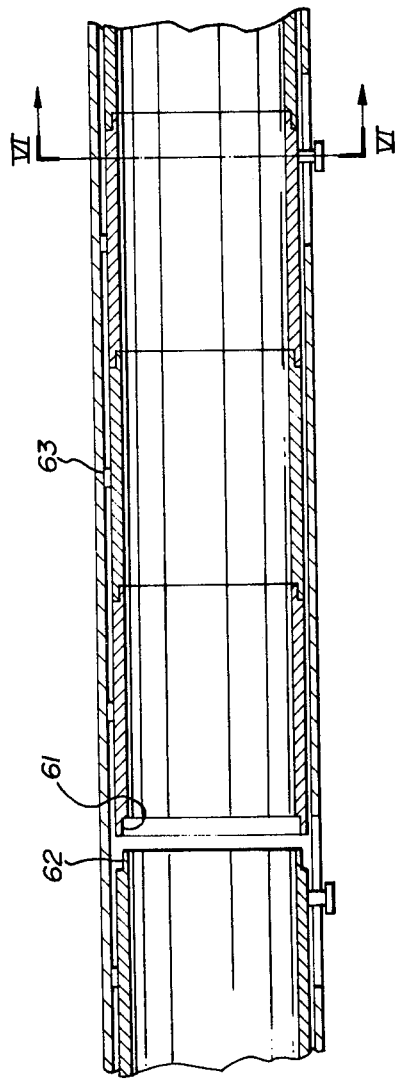
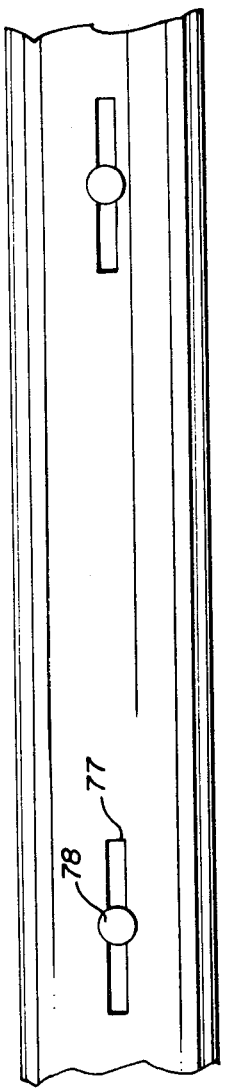
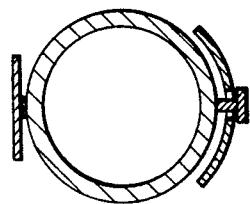

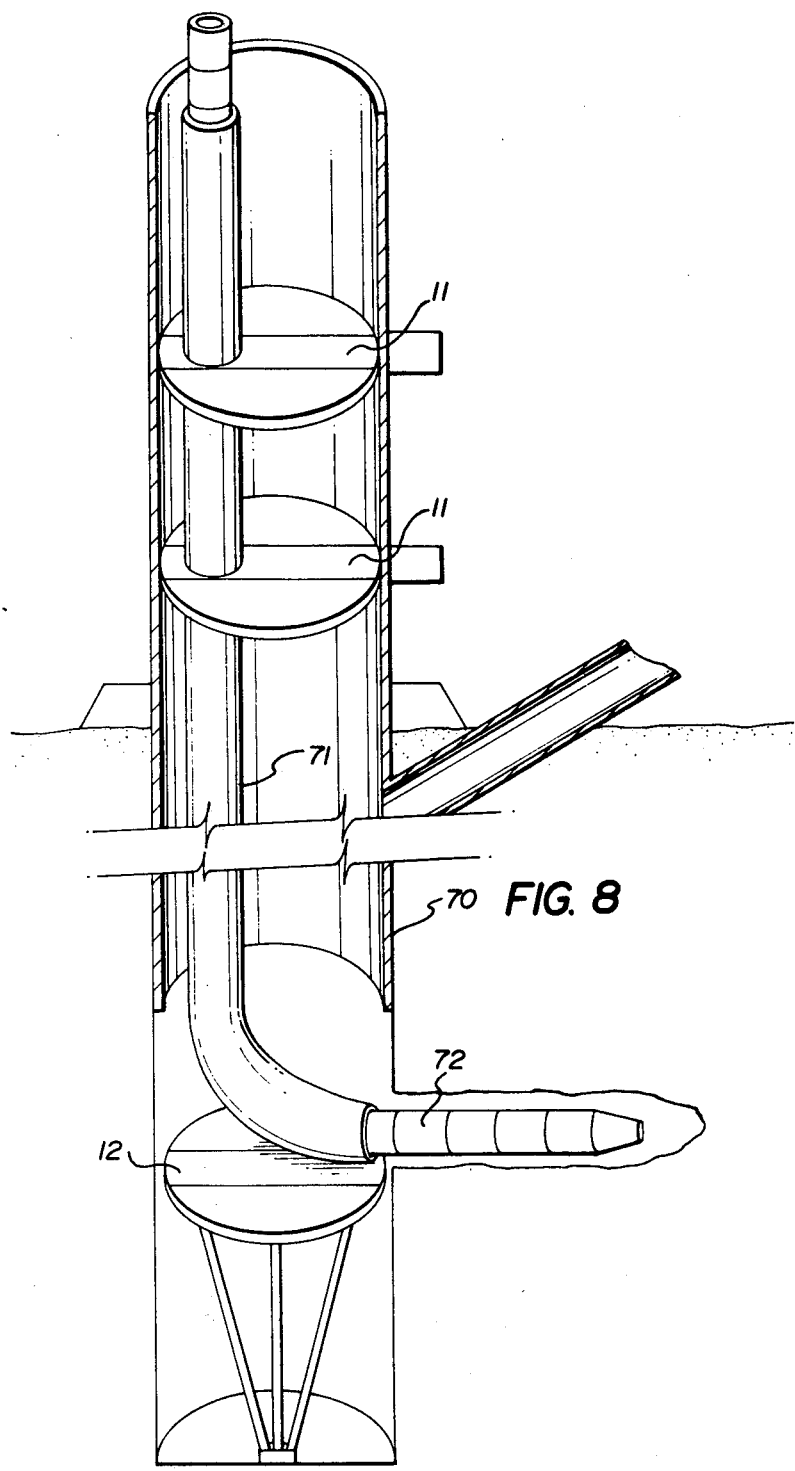

FLEXIBLE CONDUIT FOR EFFECTING LATERAL CHANNELLING IN COAL OR OIL SHALE BEDS

This invention relates to methods for making lateral channels in underground coal deposits or oil shale deposits and means for effecting such methods.

One of the problems in the development of underground coal gasification installations to facilitate systematic recovery of the energy in coal seams is the lateral linking to two vertical channels to serve as the initial gasification channels.

In the prior art, the predominant technology has been mechanical, that is, the channels have been created through the mining of galleries from underground locations, or from the surface by angled drilling.

Other techniques for horizontally linking coal beds may be accomplished by diffusion, electrolinking or hydraulic fracturing.

However, all of these methods are expensive, they either have, a low drilling speed, the channel is of an insufficient diameter, or they lack accuracy in the direction of the link.

In common they must all only be used for short distances so that their unit costs are high.

SUMMARY OF THE INVENTION

The principal object of the present invention is to provide a method and a means for accomplishing the method of horizontal linking which is superior in performance and of lower unit cost.

It is a further object of the present invention to provide a more accurate system of horizontally linking, at least insofar as direction is concerned, to control the direction and to increase the speed of effecting these horizontal channellings.

The present invention is believed to be capable of fifty to one hundred linear feet per twenty-four hour period and capable of extending distances of at least three hundred feet.

In accordance with the present invention, an air supply or a gaseous oxidant is pressure fed through a flexible tube to an air injector at a burning carbonaceous interface. The pressurized air flow in the burning chamber drives the fire forward and creates a channel similar to a drilled hole. It is a corollary of the air pressure that the ash debris which is produced as a result of combustion is forced in a reverse direction to the fire and facilitates the drying of the channel around the burning chamber.

The invention will be more clearly understood from the following description and drawings in which a specific embodiment is illustrated by way of example, and in which:

FIG. 2 is a longitudinal section of an air injection torch in accordance with the present invention;

FIG. 3 is a section taken along lines III—III of FIG. 2;

FIG. 4 is a section taken along lines II—II of FIG. 2;

FIG. 5 is a longitudinal section of a ring hose structure in accordance with the present invention and serves to illustrate the flexible facility of the ring hose.

FIG. 6 is a section taken along lines A—A of FIG. 5; and

FIG. 7 is a plan view of part of the section of the ring hose structure, namely the bottom plate.

FIG. 8 is an enlarged longitudinal sectional view of the apparatus of this invention.

Figure 1:
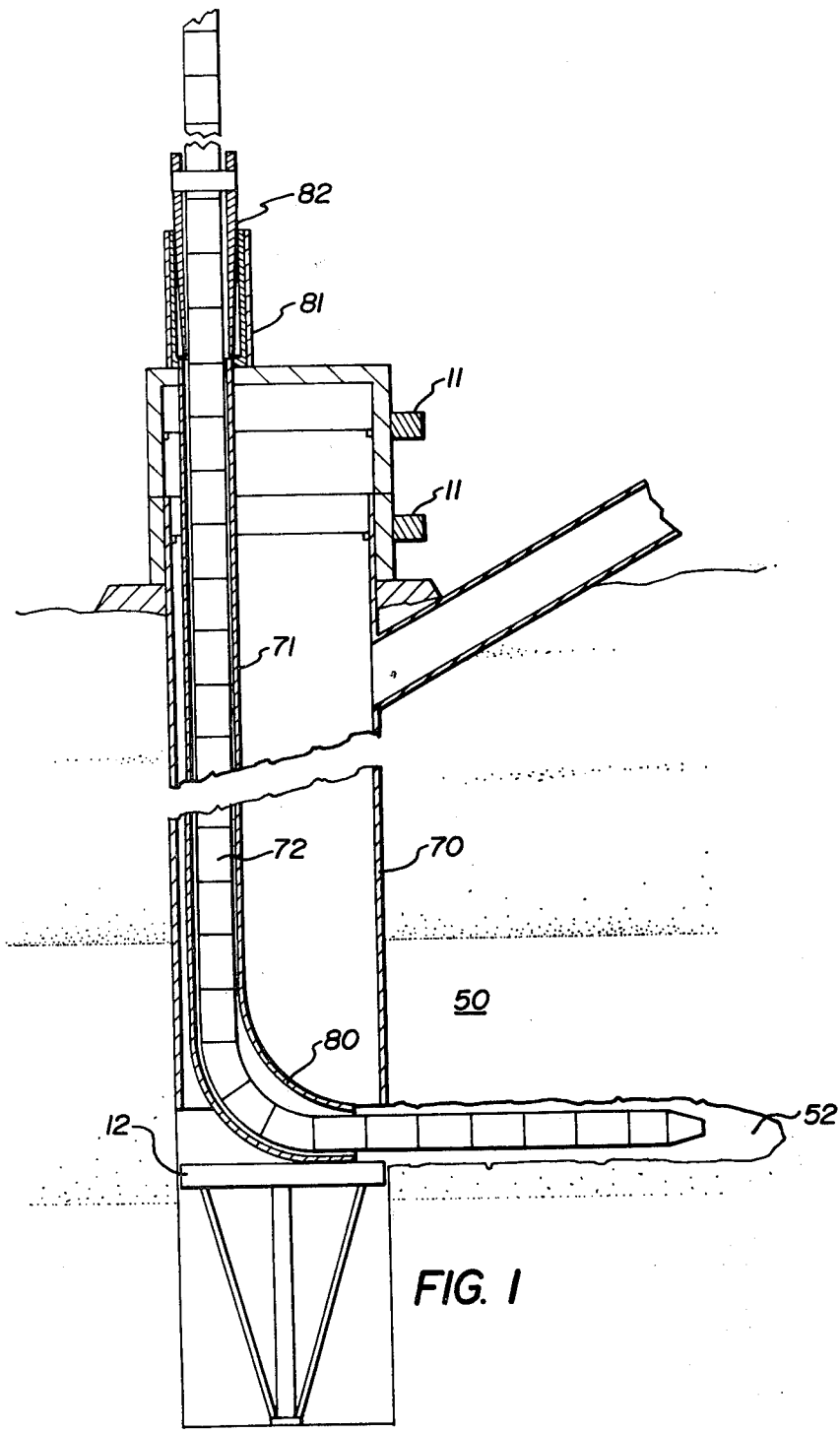
FIG. 1 is a general schematic view through a section of earth and serves to illustrate the relationship of the linking channel, the coal bed and the vertical shafts, together with a general concept of the method and structure of the present invention.

As mentioned previously, this present technology or system can be employed either with shale oil beds or coal beds.

As illustrated in FIG. 1, initially a well bore 70 is drilled vertically. This well may be of approximately 12" diameter and is normally provided with a steel casing which terminates above the area of the exposed seam 50 which is intended to be channelled. Through this well bore 70, a steel tubular casing such as 71 is mounted and through this is passed the apparatus, generally indicated at 72 which is the subject matter of one aspect of the present invention. The steel tube 71 is provided at its lower end with an elbow 80 and the upper end is provided with a rotating mechanism 11 which serves to rotate and orient the elbow 80 in the direction in which the channelling is to be effected. It will of course be understood that suitable marking arrangements will be provided on the rotation mechanism 11 such as will enable the elbow 80 to be correctly aligned in the desired direction.

Through the casing 71 and elbow 80, the combustion equipment in accordance with the present invention is inserted. This equipment comprises essentially, as illustrated in FIGS. 2 through 7, an inner flexible air hose 4 which is surrounded on the outside by a ring hose generally indicated at 6. The ring hose 6 comprises a series of tubular sections which are shaped at either end to provide a temporary joint with the next adjacent section such as at 61 and 62 in FIG. 5. These mating sections are preferably "doved-tailed" and surround the flexible tube 4 in a spaced apart relationship in the manner illustrated in FIG. 3. On the upper side, exterior to the ring hose sections 6, a continuous flexible metal sheet 5 extends along the entire length of the structure and is secured by welding, as at 63, to each of the respective sections of the ring hose structure. This continuous flexible sheet, as illustrated in FIG. 3, only extends about part of the perimeter of the ring hose sections 6.

On the underside of each ring hose section 6 there extends a second continuous metal strip 7. This second strip 7 is provided with spaced apart slots such as 77, shown in FIG. 7, which engage pins or heads 78 permanently secured to the underside of spaced apart sections 6 of the inner ring hose structure. Both metal strips 5 and 7 are flexible in character.

This structure as illustrated in FIG. 1 permits the flexible inner hose and the ring hose to bend around the elbow 80 as illustrated in FIG. 1 and as this is accomplished the pins 78 will be caused to move down their respective slots and accommodate the extension of the hose as it turns and moves about the corner.

As will be seen in FIG. 6, by this arrangement, the abutting ends 61 and 62 are permitted to move relative to each other.

At the forward end, the combustion end, a nozzle 1 is provided. This nozzle is supported in a spaced apart relationship from the end of the flexible tube 4 by a rigid tube and welded to a tube 32 which is also welded to the inside of tube 4. This tube 2 in turn supports through arms 20 a series of arcuate support and guide plates 3 which are arranged radially about tube 2.

As has been mentioned previously, the nozzle 1 and the remainder of the flexible tube structure is passed down through the casing 71 by means of a feeding mechanism indicated at 81, 82 and around the elbow 80 and oriented in the direction in which the channel 52 is to be made. It will be observed that the nozzle 1 is a conic instrument with an angled inside bore and wide orifice. The control of the optimum air supply and air flow in the burning chamber serves to control the air flow in the direction of the channel 52. The plates 2 which are mounted on tube 3 while serving to guide the nozzle, also serve as heat protectors and diffusers, and provide further assistance in directing the air stream on to the burning surface.

The air hose 4 will of course be understood to be of any suitable configuration or form, but it should be capable of withstanding pressure up to 2,200 PSI.

It will also be understood all necessary components are of high-temperature resistant alloys or materials. After installation of the nozzle in the proper direction, a burning interface is initiated at the area in which the channel is desired. The upper end of the flexible hose 4 is connected to a suitable compressed air source. The air supply, the gaseous oxidant, is fed under pressure through the hose 4 to the nozzle 1 where the pressurized air flow maintains and drives the burning interface forward in its direction to create the channel 52 similar to a drilled hole. The air pressure forces the ash debris in the opposite direction to the surface and also assists in drying the coal seam in the immediate vicinity around the burning chamber and ahead of the progressing fire. As the coal immediately in advance of the burning surface is consumed, then the air nozzle and the remainder of the tube may be advanced by mechanical means and effect the continuous advancement of the channel 52.

As it advances, the plates 2 maintain the nozzle above the floor of the channel and center it so that they will assist in directing the air stream on to the burning surface.

While it will be understood that a single embodiment of the present invention has been described with some particularity, other modifications may be made thereto without departing from the spirit and scope of the invention as described.

I claim:

1. Bendable hose apparatus having a combustion end for continually supplying a combustion-supporting gas to a subsurface carbonaceous formation to produce a tubular cavity therein by combustion of said carbonaceous material in the formation which comprises: an inner continuous gas-conducting hose; an outer armour hose surrounding said inner hose, said outer hose comprising a plurality of individual tubular sections moveable into and out of engagement with adjacent individual sections in response to said hose attitude; a first continuous flexible metal strip secured to each of said outer hose sections; and a second continuous flexible metal strip slidably connected to each of said outer hose sections opposite said first metal strip securement; and a rigid, metal heat-resistant nozzle mounted at least on said inner hose at a combustion end thereof.

2. Apparatus as claimed in claim 1 wherein said individual sections of said outer hose each have an end surface, said end surfaces each being stepped to reciprocally engage adjacent end surfaces.

3. Apparatus as claimed in claim 1 wherein said first flexible metal strip is permanently secured at a fixed point on each of the said individual sections.

4. Apparatus as claimed in claim 2 wherein said second metal strip has a plurality of longitudinal slots therein; and each of said outer hose sections has a projection extending therefrom engageable with an individual one of said slots.

5. Apparatus as claimed in claim 1 wherein said nozzle has a forward and rear end and comprises inner and outer members; said inner member comprising a heat resistant tube converging adjacent to the forward end secured to said inner hose; and said outer members being secured to said inner member adjacent the forward end thereof and to the outer hose adjacent the forward end thereof.

6. Apparatus as claimed in claim 5 wherein said outer members comprise a plurality of radially spaced heat-dissipating and direction-guiding shields converging toward the forward end of said nozzle; and a plurality of supports extending from said inner member to maintain said outer members in a spaced apart relationship therefrom.

* * * * *